J. H. Beauregard,
Hollow Auger,
N°85,423.   Patented Dec. 29, 1868.
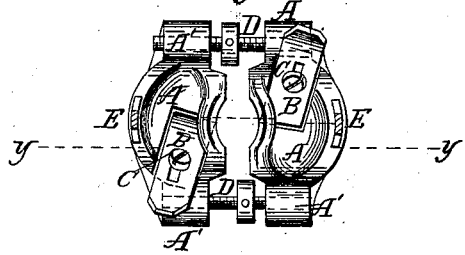
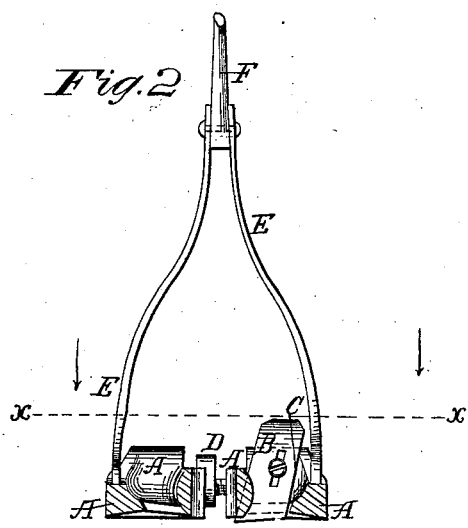
Witnesses:
Theo Tusche
G. A. Service
Inventor:
J. H. Beauregard
Per Mynn & Co.
Attorneys

J. H. BEAUREGARD, OF SANDY HILL, NEW YORK.

Letters Patent No. 85,423, dated December 29, 1868.

IMPROVEMENT IN HOLLOW AUGERS.

The Schedule referred to in these Letters Patent and making part of the same.

*To all whom it may concern:*

Be it known that I, J. H. BEAUREGARD, of Sandy Hill, Washington county, New York, have invented a new and improved Hollow Auger; and I do hereby declare that the following is a full, clear, and exact description thereof, which will enable others skilled in the art to make and use the same, reference being had to the accompanying drawings, forming part of this specification, in which—

Figure 1 is a horizontal section of my improved hollow auger, taken through the line $x$ $x$, fig. 2.

Figure 2 is a cross-section of the same, taken through the line $y$ $y$, fig. 1.

Similar letters of reference indicate corresponding parts.

My invention has for its object to furnish an improved hollow auger, for tenoning spokes, and for similar purposes, so constructed as to do its work quickly, easily, and accurately, and which may be readily adjusted to cut tenons of different sizes; and It consists in the combination of the jaws, cutters, adjusting-screws, and spring-arms, with each other, as hereinafter more fully described.

A are the jaws of the auger, which are made in the general form shown in fig. 1.

B are the knives or cutters, the cutting-edges of which pass out through slots formed in the bottom of the middle parts of the said jaws, and which are adjustably secured in place by set-screws C passing through slots in said cutters, and screwing into the said jaws.

The ends of the jaws A are secured to each other by double screws, D, the screw-threads upon each end of which run in different directions, so that, by turning the said screws in one direction, the jaws will be drawn towards each other, and, by turning them in the other direction, the said jaws will be spread apart. This enables the auger to be adjusted so as to cut tenons of any desired size.

Through the middle part or body of the screws D are formed holes, as shown in fig. 1, so that they may be turned, to adjust the jaws, by passing a pin or any pointed instrument through the said holes.

E are arms, the lower ends of which are securely attached to the sides of the jaws A, which pass up with a curve, and the ends of which are attached to the shank F, by means of which the auger is operated.

The arms E are made of steel, so that they may have the necessary elasticity to adjust themselves to the various positions of the jaws A.

I am aware that a patent has been granted to M. Isbell, dated May 7, 1867, for a hollow auger, which somewhat resembles my invention, although the construction and arrangement of the parts are different; and I hereby disclaim the devices, and arrangement of devices contained in said patent of M. Isbell.

Having thus described my invention,

What I claim as new, and desire to secure by Letters Patent, is—

An auger, consisting of the shank F, adjusting-springs E E, adjustable jaws A A, with projections A' A' attached thereto, and slotted, so as to receive the adjustable slotted cutters B B, set-screws C C, and right and left-hand screws D D, all constructed, arranged, and operated as and for the purpose set forth.

J. H. BEAUREGARD.

Witnesses:
ANTHONY YARTES,
GEORGE BARNEY.